(12) United States Patent
Eversole et al.

(10) Patent No.: US 6,778,209 B1
(45) Date of Patent: *Aug. 17, 2004

(54) FURNACE VIDEO CAMERA APPARATUS

(75) Inventors: Donald L. Eversole, Pickerington, OH (US); Howard R. Smith, Grove City, OH (US); Mike A. Garrabrant, Johnstown, OH (US)

(73) Assignee: Diamond Power International, Inc., New Orleans, LA (US)

( * ) Notice: Subject to any disclaimer, the term of this patent is extended or adjusted under 35 U.S.C. 154(b) by 566 days.

This patent is subject to a terminal disclaimer.

(21) Appl. No.: 09/680,578

(22) Filed: Oct. 6, 2000

Related U.S. Application Data

(63) Continuation-in-part of application No. 09/456,638, filed on Dec. 8, 1999, now Pat. No. 6,239,831, which is a continuation-in-part of application No. 08/938,195, filed on Sep. 26, 1997, now Pat. No. 6,069,652.

(51) Int. Cl.$^7$ .................................................. H04N 7/18
(52) U.S. Cl. ......................................... 348/83; 348/65
(58) Field of Search ........................... 348/83, 143, 82, 348/61, 84, 85, 65, 373; 382/141; 362/373

(56) References Cited

U.S. PATENT DOCUMENTS

| | | | |
|---|---|---|---|
| 3,097,263 A | | 7/1963 | Lintern |
| 3,873,419 A | * | 3/1975 | Sletten ........................ 376/352 |
| 3,958,080 A | * | 5/1976 | Schadler ...................... 348/84 |
| 4,432,286 A | | 2/1984 | Witte |
| 4,814,868 A | * | 3/1989 | James ......................... 348/83 |
| 4,965,601 A | | 10/1990 | Canty |
| 4,969,035 A | | 11/1990 | Dawson |
| 5,068,720 A | | 11/1991 | Herlitz |
| 5,162,906 A | * | 11/1992 | Yorita et al. ................... 348/83 |
| 5,587,736 A | | 12/1996 | Walls |
| 5,592,217 A | * | 1/1997 | Hirvonen et al. .............. 348/83 |
| 5,864,365 A | * | 1/1999 | Sramek et al. ............... 348/373 |
| 6,012,967 A | * | 1/2000 | Satake et al. .................. 451/36 |
| 6,069,652 A | * | 5/2000 | Eversole et al. .............. 348/83 |
| 6,239,831 B1 | * | 5/2001 | Eversole et al. .............. 348/83 |

* cited by examiner

*Primary Examiner*—Gims Philippe
(74) *Attorney, Agent, or Firm*—Eric Marich; Michael J. Seymour

(57) ABSTRACT

A high temperature camera apparatus having an elongated steel camera housing tube and an elongated steel camera housing tube and an elongated camera support member, supporting a video camera at the furnace interior end of the camera housing tube. A ceramic heat shield tube telescopically surrounds at least a portion of the camera, and preferably the portion of the camera housing tube which contains the camera. The exterior surface of the camera housing tube is plated and polished to provide a highly reflective surface, and the ceramic heat shield tube is telescopically surrounded by an outer steel tube. The ceramic heat shield is spaced in position around the camera housing tube by a plurality of spacers projecting outwardly from the outer surface of the camera housing tube. A steel end plate is fixed at the furnace interior end of the camera housing tube, and is provided with an image hole aligned with the image axis of the camera, and a plurality of spaced ventilation holes surrounding the image hole. A ceramic end plate is mounted in an inturned end of the ceramic heat shield tube, and seated against a plurality of spacers distributed on the steel end plate by a plurality of springs. Alternatively, the ceramic heat shield is mounted to the end plate with a tubular shroud within it. A liquid coolant jacket may also be formed on radially opposite sides of the camera housing tube.

21 Claims, 4 Drawing Sheets

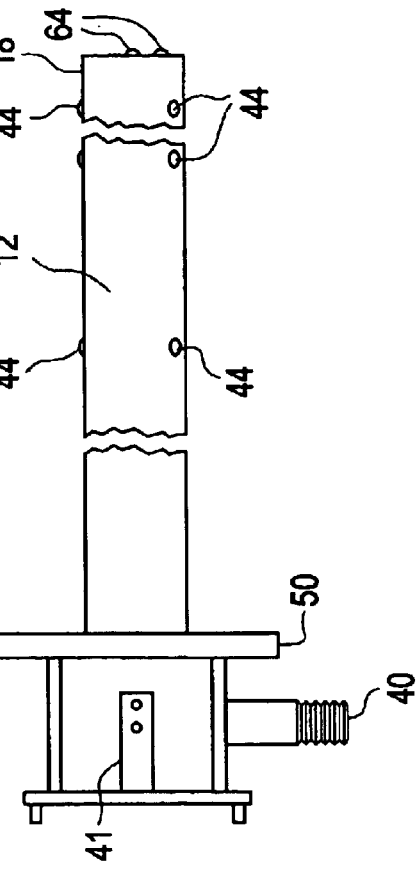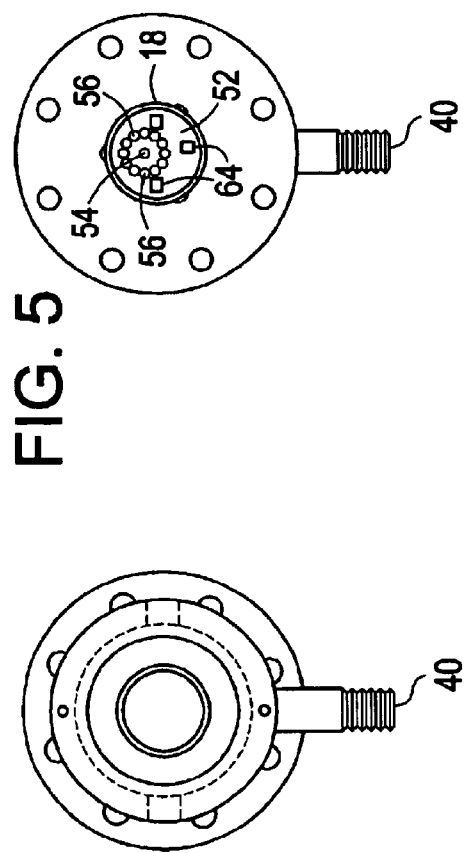

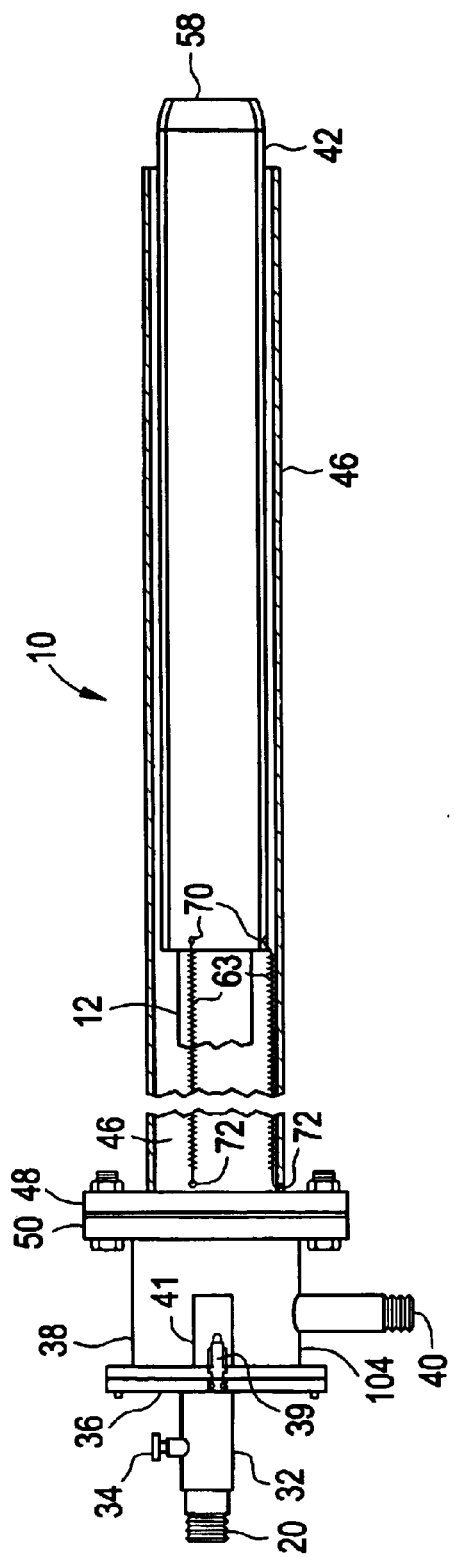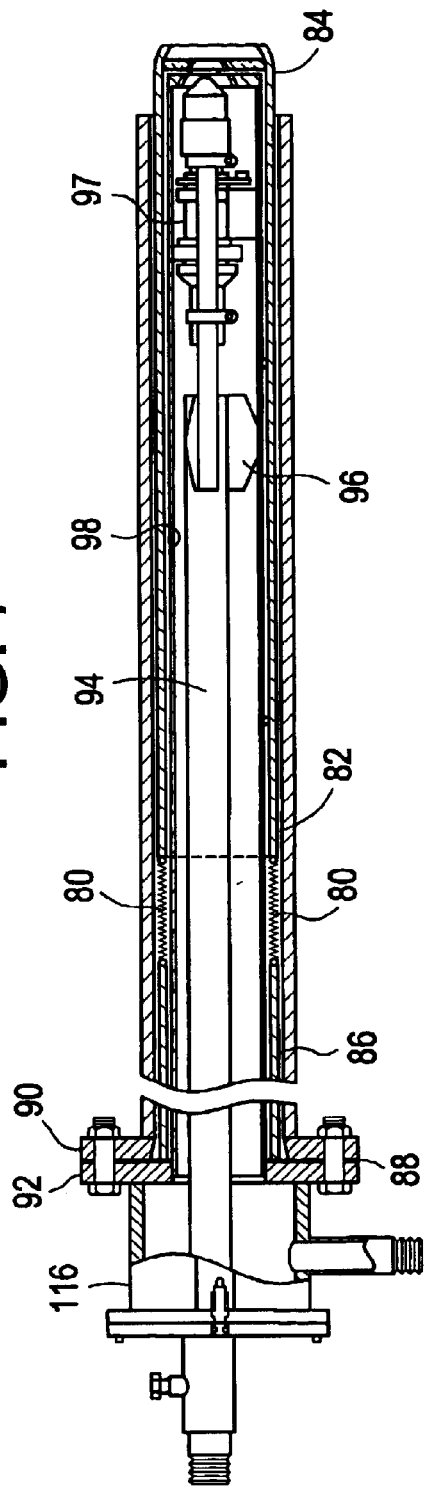

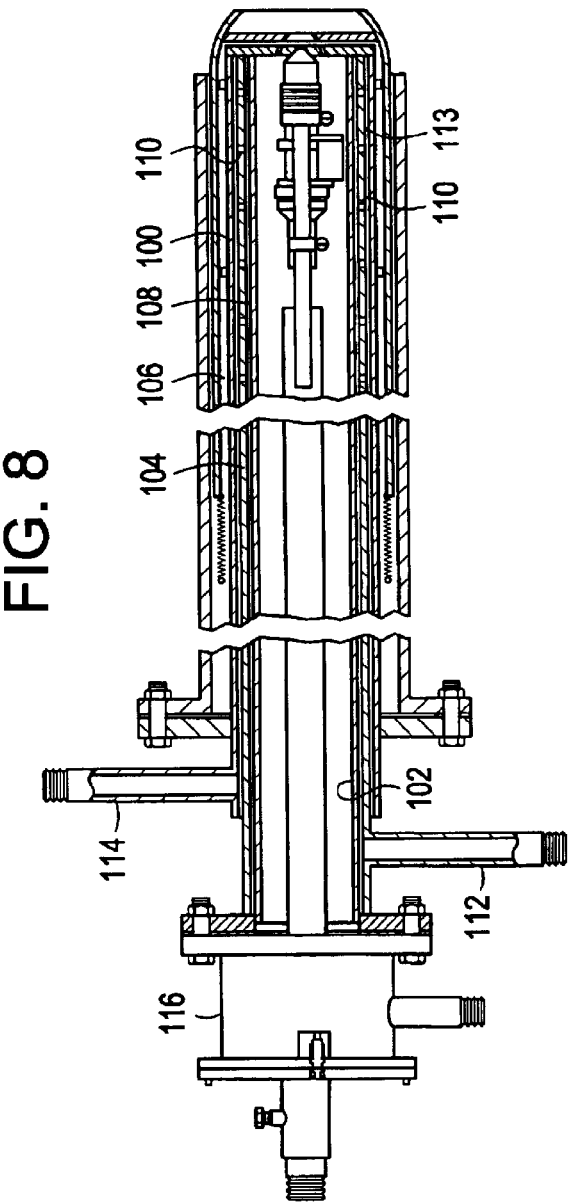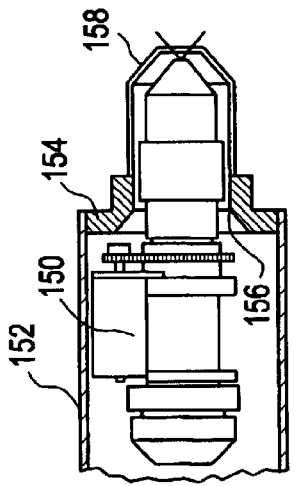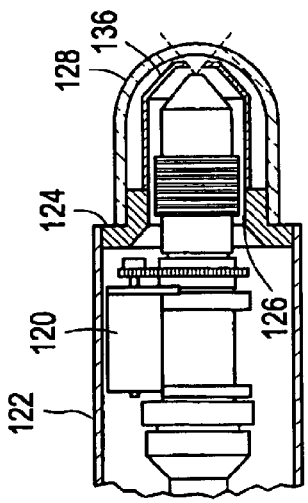

FURNACE VIDEO CAMERA APPARATUS

This application is a continuation-in-part of U.S. application Ser. No. 09/456,638 filed Dec. 8, 1999, now U.S. Pat. No. 6,239,831 which is a continuation of Ser. No. 08/938,195 filed Sep. 26, 1997 U.S. Pat. No. 6,069,652 granted May 30, 2000.

BACKGROUND OF THE INVENTION

1. Field of the Invention

This application relates generally to apparatus for monitoring industrial processes, and more particularly relates to a video camera and associated thermal protection apparatus for viewing the interior of a heated chamber.

2. Description of the Related Art

Video cameras are commonly used in CCTV systems associated with the operation and control of industrial processes. The prior art teaches a variety of video camera systems for viewing the interior of a hot, hostile environment, such as a high temperature furnace chamber, through an opening provided in a wall of the chamber. Because a furnace may typically reach temperatures on the order of 2000° F.–3000° F., yet video cameras cannot tolerate temperatures much in excess of 100° F., it is necessary to provide thermal insulation and cooling to prevent damage to the video camera.

In the customary approach, the prior art utilizes an elongated steel tube, extending through the opening in the wall of the high temperature chamber. The tube contains a series of spaced optical elements, including lenses, to form a relay tube. The camera is positioned outside or near the outside of the chamber wall, and the series of optical elements transmit the image and focus it on the camera away from the hot, hostile environment. Relay lens tubes or relay tubes of this type typically may range from 2 feet long to 20 feet long.

One difficulty with such prior art systems is that the high temperatures and the variations in temperature make it extremely difficult to maintain the close tolerances which are necessary for accurately transmitting the image through the relay tube. These thermal stresses cause relative movement of the relay tube components, thereby introducing image distortion. Additionally, each lens or optical element introduces some distortions as a result of its imperfections. Consequently, video systems utilizing such lens tubes have limited performance and are expensive, demanding high quality lenses in order to obtain and maintain the formation of an image of acceptable quality.

Another difficulty with such prior art systems arises from the fact that there are a variety of different furnaces, and consequently such systems require the availability of numerous lens tubes to accommodate the variabilities of different installations. The need to design and to construct a variety of lens tubes further increases cost.

It is therefore an object and feature of the present invention to eliminate the typical lens tube and its relay optics and position the camera at the interior end of a thermally protective tube structure in order to eliminate the costs and problems associated with a relay lens tube and improve the image quality, while providing a cooling and thermal isolation system capable of maintaining the camera environment at a temperature on the order of 100° F. or less. Elimination of the relay lens tube not only enhances the quality of the available image, but also eliminates the requirement for and therefore the cost of the design and maintenance of a broad variety of relay lens tubes for different installations.

SUMMARY OF THE INVENTION

In the present invention the camera is mounted on a camera support member and positioned at the interior end of surrounding, protective tubes. One of the tubes is a ceramic heat shield extending from the furnace interior end of the video camera apparatus toward the furnace exterior a distance which at least partially surrounds the linear, axial interval containing the camera. The term camera, unless otherwise indicated, is used to include both the camera portion which converts an optical image to an electronic signal and the lens portion attached to the camera portion for focusing the image on the photosensitive surface of the camera. More particularly, the camera apparatus of the present invention has an innermost, elongated camera housing tube extending through the opening in the wall of the heated chamber and an air inlet manifold at the exterior end of the camera housing tube for transporting cooling fluid into the exterior end, through the camera housing tube and into the furnace. The ceramic heat shield telescopically surrounds and is spaced from at least a portion of the camera housing tube containing the camera. The camera housing tube may have an exterior, reflective surface formed by a chrome plating and a plurality of radially outwardly tapered spacers projecting from the exterior surface of the camera housing tube for retaining the ceramic heat shield in a concentric position while making minimum contact with it. The invention may also have an outer steel, tubular sleeve, telescopically surrounding the ceramic heat shield tube, a first steel end plate at the interior end of the camera housing tube, and a second ceramic end plate at the interior end of the ceramic heat shield tube.

BRIEF DESCRIPTION OF THE DRAWINGS

FIG. 3 is a view in side elevation of the camera housing tube and associated air inlet manifold of the embodiment illustrated in FIG. 1.

FIG. 4 is a left end view of the structure illustrated in FIG. 3.

FIG. 5 is a right end view of the structure illustrated in FIG. 3.

FIG. 6 is a cross-section of the embodiment of FIG. 1, also taken substantially along the line 2—2 of FIG. 1, but illustrating the ceramic heat shield in side view.

FIG. 7 is a view in axial section similar to the sectional view of FIG. 2, and illustrating an alternative embodiment of the invention.

FIG. 8 is a view in axial section similar to the sectional view of FIG. 2, illustrating yet another alternative embodiment of the invention having water cooling.

FIG. 9 is a view in axial section illustrating a portion of still another alternative embodiment of the invention.

FIG. 10 is a view in axial section illustrating a portion of still another alternative embodiment of the invention.

Figure 1:
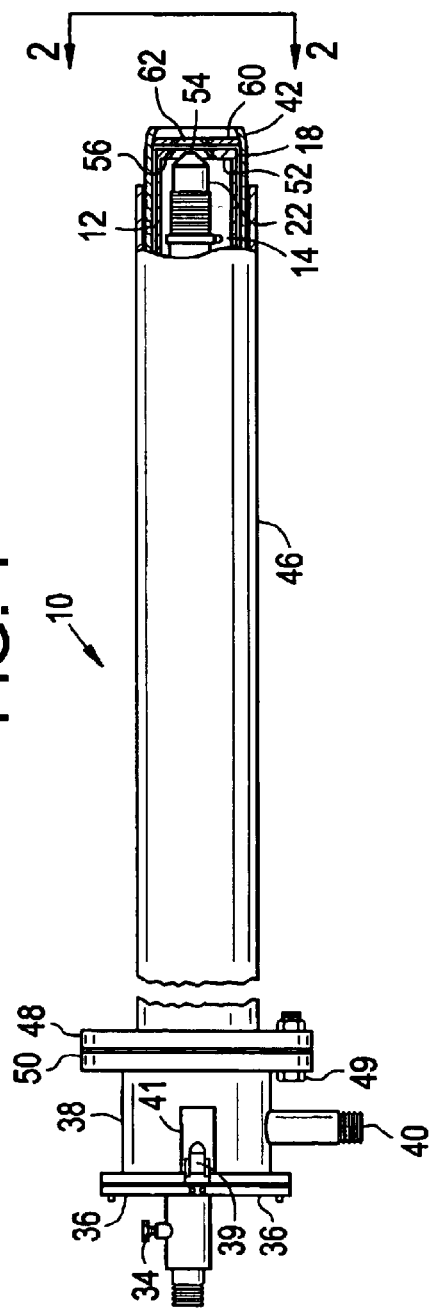
FIG. 1 is a side view of an embodiment of the invention having a segment of the furnace interior end removed to reveal the end plates and a portion of the camera mounted at the interior end.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DESCRIPTION OF THE PREFERRED EMBODIMENT

Figure 2:
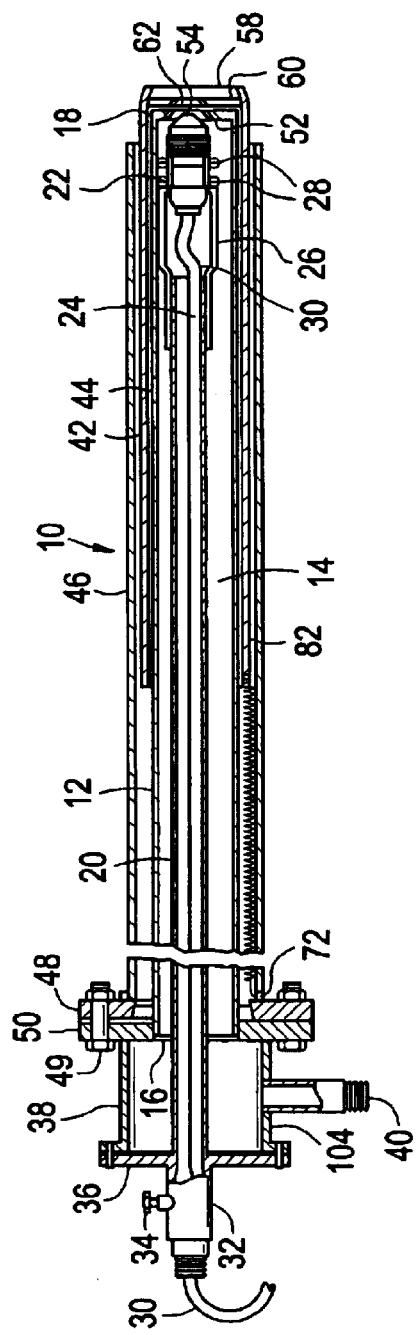
FIG. 2 is a view in cross-section taken substantially along the line 2—2 of FIG. 1 showing the embodiment illustrated in FIG. 1.

Referring simultaneously to FIGS. 1–6, the invention is a high temperature camera apparatus 10 for viewing the interior of a high temperature chamber, such as a furnace through an opening in a wall enclosing the chamber in the same manner as a conventional relay lens tube of the prior art. The camera apparatus 10 has an elongated, steel camera housing tube 12, which is cylindrical and has an interior passage 14, the housing tube 12 has an exterior end 16 for mounting relatively nearer the exterior of the chamber wall, and an interior end 18 for mounting near the interior of the chamber wall.

Within the elongated camera housing tube 12 is an elongated camera support member 20 which, in the preferred embodiment, is a tubular pipe forming a camera support wand. A video camera 22 is mounted near the interior end 24 of the camera support member 20 by means of a pair of support brackets 26, attached to the camera support member 20 by means of welding. The camera support member 20 supports the camera near the interior end of the camera housing tube 12 by means of circular clamps 28, and extends out the exterior end. An electrical cable 30 passes through the interior of the camera support member 20, into connection with the camera 22 for feeding electrical signals. The camera support member 20 is clamped inside a sleeve 32 by means of a radial bolt 34 to permit axial adjustment and the sleeve 32 is itself welded to a circular plate 36.

The plate 36 is attached to an air inlet manifold 38 by means of a pair of diametrically opposite, manually releasable latches 39 (only one visible), connected between the plate 36 and a latch mounting block 41 formed as a boss on the exterior of the manifold 38. This permits the plate 36 to be manually removed from the manifold 38 so that the entire camera support member 20, and the camera 22 mounted to it, can be withdrawn from the camera housing tube 12, and easily accessed for service or replacement.

The air inlet manifold 38 includes an air inlet 40 in fluid communication through the interior of the manifold 38, with the interior passage 14 of the camera housing tube 12. This permits cooling air to be blown into the air inlet 40 and transported from the exterior end to the interior end, along the interior passageway 14 for cooling the camera and passing out into the furnace. A vortex cooler for cooling the air incoming through the air inlet 40 to approximately 29° F. has been found particularly desirable for use with the preferred embodiment of the invention. Additionally, air is preferably blown through the furnace camera apparatus at a rate on the order of 10–50 CFM.

A cylindrical, ceramic, heat shield tube 42 telescopically surrounds and is spaced from the camera housing tube 12. It extends from interiorly of the interior end of the camera housing tube 12 toward the exterior end of the camera housing tube, a distance which is at least sufficient to surround the video camera 22 and preferably extensively beyond. For example, in one embodiment of the invention the camera housing tube is approximately 36 inches long and the ceramic heat shield tube is approximately 18 inches long. The preferred ceramic material is a large pore size alumina-silica oxide mixture sold under the trademark Mullite.

The ceramic heat shield tube 42 is positioned in spaced surrounding relationship to the camera housing tube 12 by means of a plurality of spacers 44, which are distributed around and project outwardly from the exterior surface of the camera housing tube 12. These spacers 44 are preferably tapered radially outwardly toward a point, for example in a conical or pyramidal configuration, in order to minimize thermal, conductive contact between the camera housing tube 12 and the ceramic heat shield tube 42. The reflective steel tube 12 and the ceramic tube 42 function as a multilayer radiation shield, minimizing the thermal radiation incident on the camera lens. The reflective surface on the steel tube 112 reflects the incoming thermal radiation from the ceramic tube 42, causing the ceramic tube to increase to a high temperature, decreasing the thermal radiation potential from the furnace to the ceramic tube. Since the ceramic tube 42 can be heated to a much higher temperature than the steel tube, the resulting thermal radiation flux from the furnace to the steel tube 12 or camera is significantly reduced compared to using the reflective steel tube 12 without the ceramic tube 42.

Preferably the camera housing tube 12 of this embodiment is a steel tube which is provided with an exterior, reflective surface, such as a chrome plating which preferably is polished. The reflective surface enhances the radially outward reflection of incident thermal radiation, which is radiated inwardly from the interior surface of the ceramic heat shield tube 42.

An outer, steel, tubular sleeve 46 is either welded to a circular flange 48 and telescopically surrounds the ceramic heat shield tube 42 or it can be omitted and the remaining components slid into an existing hole through the refractory wall of a heated chamber. The flange 48 of the outer sleeve 46 is bolted to a circular flange 50 which is a part of the air inlet manifold 38. The flange 50 also has a central port into which the camera housing tube 12 is inserted and fastened by welding. The function of the outer carbon steel tube 46 is to provide an attachment method to the furnace wall. The furnace end of the carbon tube will be welded to the furnace wall. The camera assembly then attaches to the carbon steel tube flange via bolts 49.

Mounted at the interior end 18 of the camera housing tube 12 is a steel end plate 52. The steel end plate 52 has an image hole 54 which is conically shaped in a direction which is expansive from the furnace interior toward the exterior, in order to receive the conical end of the camera 22 in alignment with the image axis of the camera 22. A plurality of spaced ventilation holes 56 circularly surround the image hole 54. These ventilation holes 56 are inclined inwardly in the direction from the exterior toward the interior of the heated chamber for permitting exhaust of cooling air into the furnace chamber and directing the airflow from the interior of the camera housing tube 12 into the interior of the furnace. By positioning the ventilation holes 56 in this orientation and arrangement, the cooling of the end plate 52, where it contacts the camera 22, is maximized, and additionally the escaping air maintains the interior end of the apparatus free of slag or other contaminants which might otherwise block the view of the camera 22. The cooling hole orientation and arrangement minimizes the amount of contact of the cooling air on the hot ceramic disk 60 which could cause a high thermal stress on the front ceramic disk 60 possibly cracking it.

The interior end 58 of the ceramic heat shield tube 42 is inturned in a frusto-hemispheric shape. A ceramic end plate 60 is seated against, and preferably cemented to, the interior of the inturned end 58 and has a port 62 concentric with the image hole 54 of the steel end plate 52. The annular wall defining the port 62 of the ceramic end plate 60 is angled so the port tapers inwardly from the exterior to the interior of the furnace. This minimizes the cooling of the ceramic end plate 60 in order to minimize the stress on the ceramic. This also helps maintain it free and clear of slag or other contaminants.

A plurality of spacers 64 are mounted to and project toward the furnace interior from the interior end of the steel end plate 52. These spacers 64 seat against the ceramic end plate 60. They are also tapered outwardly to minimize contact with the ceramic end plate 60. The ceramic heat shield tube 42 carrying its ceramic end plate 60 is spring biased by tensioned coil springs 63. These springs 63 are circumferentially spaced at 120° intervals around and outwardly of the camera housing tube 12, and tensioned between a set of three similarly spaced holes 70 drilled radially through the exterior end of the heat shield tube 42 and a set of three similarly space holes 72 drilled radially through the exterior end of the outer sleeve 46. The springs 63 pull the ceramic heat shield tube 42 toward the furnace exterior, thereby seating the ceramic end plate 60 against the spacers 64 to secure the heat shield tube 42 in position against the interior end of the spacers projecting from the steel end plate 52. This spring loading avoids the application of too much force on the ceramic when it is heated, which would otherwise increase the probability of fracture. As the ceramic tube 42 heats and expands it can expand forward and the ceramic end plate 60 could block the view of the camera if not pulled toward the exterior end by the springs 63.

This combination of an interior camera housing tube through which air is passed and a surrounding ceramic heat shield tube permit the camera 22 to be mounted at the interior end of this structure, thereby eliminating the need for a relay lens tube. This is particularly effective when the exterior surface of the camera housing tube is made reflective, and further enhanced by the use of an outer, steel, tubular sleeve, telescopically surrounding the ceramic heat shield tube. It is believed that this combination of structures provides the first video camera viewing system, which provides sufficient thermal isolation that the camera may be mounted at the interior end of the assembly, and the relay lens tube eliminated.

FIG. 7 illustrates an alternative embodiment of the invention having minor variations from the embodiment illustrated in FIGS. 1–6. In FIG. 7, the springs 80 extend from the exterior end 82 of the ceramic heat shield tube 84 into connection with holes at the end of a steel tube 86, connected to an annular flange 88, compressed between the flanges 90 and 92. Additionally, the camera support member 94 is provided with three outwardly extending spacer fins 96, welded to the camera support member 94 for radially securing the camera support member 94 and the camera 97 mounted to it in position within the camera housing tube 98.

FIG. 8 illustrates yet another alternative embodiment of the invention. In the embodiment of FIG. 8, a pair of liquid cooling jacket tubes 100 and 102 sealingly engage the camera housing tube 104 at each of their opposite ends. This forms a pair of coolant jacket chambers 106 and 108, one on each radial side of the camera housing tube 104. The pair of coolant jacket chambers 106 and 108 are connected in fluid communication by a plurality of ports 110, through and distributed around the interior end of the camera housing tube 104. A pair of fluid conduits 112 and 114 are each connected in fluid communication with a different one of the coolant jacket chambers 106 and 108, so that one conduit may operate as a liquid coolant inlet and the other as a liquid coolant outlet. In this manner, liquid coolant, preferably water, may be circulated into the inlet, preferably into the radially inward coolant jacket chamber conduit 112, passes parallel to the central axis of the tubes to the interior end of the camera housing tube 106 and then passes outwardly through the ports 100 and circulates in a reverse direction and out the tube 114.

A wire spacer 113 is wound in a helical configuration in the outer flow cavity 106. The wire spacer 113 reduces the available flow area, creating a spiral flow pattern. By reducing the available flow area, the flow becomes turbulent at lower coolant flow rates, increasing the heat transfer coefficient between the coolant and the outer flow tube 100. This allows the outer stainless steel tube (with chrome plating) 100 to remain at a temperature below the boiling point of the coolant, with much lower coolant flow rates, e.g., 1 gpm instead of 5.

The cooling jacket features of the present invention may be utilized with any of the embodiments of the present invention, and preferably provides additional cooling, supplementing the air cooling through the air inlet manifold 116 in the manner described above.

FIG. 9 illustrates still another alternative embodiment of the invention. In FIG. 9 the camera 120 protrudes interiorly of the camera housing tube 122. An end plate 124 is mounted at the interior end of the camera housing tube 122 so that a portion of the camera 120 extends through a central opening 126 through the end plate 124. The ceramic heat shield 128 is mounted to the end plate 124, and extends interiorly of it. Additionally, a chrome plated and polished tubular shroud 136 is also mounted to the end plate 124, radially inwardly of the ceramic shield 128. Consequently, both the ceramic shield 128 and the shroud 136 surround at least the portion of the camera 120 internal to the internal wall of the high temperature chamber.

FIG. 10 illustrates still another alternative embodiment of the invention. In FIG. 10 the camera 150 protrudes interiorly of the camera housing 152 and end plate 154 is mounted at the interior end of the camera housing tube 152 so that a portion of the camera 150 extend through a central opening 156 through the end plate 154. A shroud 158 is mounted to the end plate 154 and surrounds at least a portion of the camera 150 internal to the internal wall of the high temperature chamber. In one embodiment the shroud 158 is configured as a nozzle. However, multiple configurations may be implemented without detracting from the spirit of the invention. The shroud 158 may be constructed of naturally occurring elements or man-made combinations including stainless steel, nickel alloy, ceramics, or other caustic resistant elements. In one embodiment, a nozzle constructed of Inconel, a nickel alloy, is implemented in a highly caustic high heat chamber. The use of the shroud 158 allows for the thermal and caustic protection of the camera 150 without "trapping" unnecessary heat within the camera housing tube 152. A temperature decreases of up to a 10° Fahrenheit may be experienced through the implementation of the disclosed embodiment. The camera housing tube 152 and the camera housing support members "not shown" are implemented as discussed previously. However, an embodiment of the apparatus without a ceramic heat shield 42 may be implemented.

While certain preferred embodiments of the present invention have been disclosed in detail, it is to be understood that various modifications may be adopted without departing from the spirit of the invention or scope of the following claims.

What is claimed is:

1. A high temperature camera apparatus including a video camera for viewing the interior of a high temperature chamber through an opening in a wall of the chamber, the apparatus comprising:

(a) an elongated camera housing tube forming an interior passageway, for extending through the opening and having an exterior end for mounting relatively nearer the exterior of the chamber wall and an interior end for mounting near the interior of the chamber wall;

(b) a removable, elongated camera support member extending into and along the camera housing tube and having the camera mounted near an interior end of the support member and extending to the exterior end, the support member supporting the camera at the interior end of the camera housing tube;

(c) an air inlet manifold including an air inlet in fluid communication with the interior passageway of the camera housing tube for transporting cooling fluid along the interior passageway and cooling the camera.

2. The apparatus of claim 1 further comprises a shroud mounted to the interior end, the shroud surrounding at least a portion of the camera.

3. The apparatus of claim 2, wherein the shroud includes a nozzle.

4. The apparatus of claim 3, wherein the nozzle includes a stainless steel nozzle.

5. The apparatus of claim 3, wherein the nozzle include a nickel alloy nozzle.

6. The apparatus of claim 1 further comprises an end plate mounted to the interior end.

7. The apparatus of claim 6, wherein the endplate includes an opening.

8. The apparatus of claim 6, wherein at least a portion of the camera extends through the end plate opening.

9. The apparatus of claim 8, further compromises a shroud mounted to the end plate.

10. The apparatus of claim 9, wherein the shroud includes a chrome plated shroud.

11. The apparatus of claim 10, wherein the chrome plated shroud includes a chrome plated and polished tubular shroud.

12. The apparatus of claim 2, wherein the nozzle includes a metal nozzle.

13. The apparatus of claim 2, wherein the nozzle includes a caustic erosion resistant nozzle.

14. An apparatus in accordance with claim 2 and further comprising a pair of liquid coolant jacket tubes sealingly engaging the camera housing tube, one coolant jacket tube radially inwardly of the camera housing tube to form a liquid coolant jacket chamber on each radial side of the camera housing tube, and a coolant inlet conduit is connected with a first one of the coolant jacket chambers and a coolant outlet conduit is connected with a second one of the coolant jacket chambers, and wherein a plurality of ports are formed through the camera housing tube to provide liquid coolant communication between the coolant jacket chambers.

15. An apparatus in accordance with claim 1 wherein the camera housing tube has an exterior reflective surface.

16. An apparatus in accordance with claim 15 wherein the camera housing tube is a steel tube which is plated and polished to form the reflective surface.

17. An apparatus in accordance with claim 16 and further comprising a pair of liquid coolant jacket tubes sealingly engaging the camera housing tube, one coolant jacket tube radially inwardly of the camera housing tube to form a liquid coolant jacket chamber on each radial side of the camera housing tube, and a coolant inlet conduit is connected with a first one of the coolant jacket chambers and a coolant outlet conduit is connected with a second one of the coolant jacket chambers, and wherein a plurality of ports are formed through the camera housing tube to provide liquid coolant communication between the coolant jacket chambers.

18. An apparatus in accordance with claim 1 and further comprising a pair of liquid coolant jacket tubes sealingly engaging the camera housing tube, one coolant jacket tube radially outwardly and one coolant jacket tube radially inwardly of the camera housing tube to form a liquid coolant jacket chamber on each radial side of the camera housing tube, and a coolant inlet conduit is connected with a first one of the coolant jacket tubes and a coolant outlet conduit is connected with a second one of the coolant jacket tubes, and wherein a plurality of ports are formed through the camera housing tube to provide liquid coolant communication between the coolant jacket chambers.

19. An apparatus in accordance with claim 1 and further comprising a pair of liquid coolant jacket tubes sealingly engaging the camera housing tube, one coolant jacket tube radially outwardly and one coolant jacket tube radially inwardly of the camera housing tube to form a liquid coolant jacket chamber on each radial side of the camera housing tube, and a coolant jacket tubes and a coolant outlet conduit is connected with a second one of the coolant jacket tubes, and wherein a plurality of ports are formed through the camera housing tube to provide liquid coolant communication between the coolant jacket chambers.

20. An apparatus in accordance with claim 1 and further comprising an end plate mounted to the interior end of the camera housing tube and wherein the ceramic heat shield tube is mounted to the end place.

21. An apparatus in accordance with claim 20 wherein a tubular shroud is also mounted to the end plate radially inwardly of the ceramic heat shield.

* * * * *